United States Patent
Das Sharma et al.

(10) Patent No.: US 7,899,111 B2
(45) Date of Patent: Mar. 1, 2011

(54) LINK INTERFACE TECHNIQUE INCLUDING DATA INDICATOR SYMBOLS

(75) Inventors: Debendra Das Sharma, Santa Clara, CA (US); David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 11/835,380

(22) Filed: Aug. 7, 2007

(65) Prior Publication Data

US 2009/0041099 A1   Feb. 12, 2009

(51) Int. Cl.
*H04B 1/38*      (2006.01)
*H04L 5/16*      (2006.01)

(52) U.S. Cl. .......................................... 375/220; 710/313
(58) Field of Classification Search .................. 375/220; 710/313
See application file for complete search history.

(56) References Cited

U.S. PATENT DOCUMENTS

| 6,249,525 | B1 * | 6/2001 | Aggarwal et al. | 370/413 |
| 7,061,407 | B1 * | 6/2006 | Lee | 341/50 |
| 2005/0021797 | A1 * | 1/2005 | Talaat et al. | 709/230 |
| 2006/0109929 | A1 * | 5/2006 | Tripathi | 375/272 |

OTHER PUBLICATIONS

United States Patent Application, pending—not yet published, U.S. Appl. No. 11/592,341, filed Nov. 2, 2006, to Ajanovic et al.
PCI Express® Base Specification, Revision 2.0, Dec. 20, 2006, pp. 1 and 167-175.

* cited by examiner

*Primary Examiner* — Curtis B Odom
(74) *Attorney, Agent, or Firm* — Law Office of R. Alan Burnett, P.S.

(57) ABSTRACT

In some embodiments, a chip includes transmitters and generation circuitry to provide data symbols and special characters to the transmitters to be transmitted. The chip also includes match detection circuitry to detect when the data symbols match the special characters; and indicator symbol generation circuitry to create data indicator symbols in response to detected matches and to provide the data indicator symbols to the generation circuitry to be provided to the transmitters to be transmitted. Other embodiments are described.

24 Claims, 6 Drawing Sheets

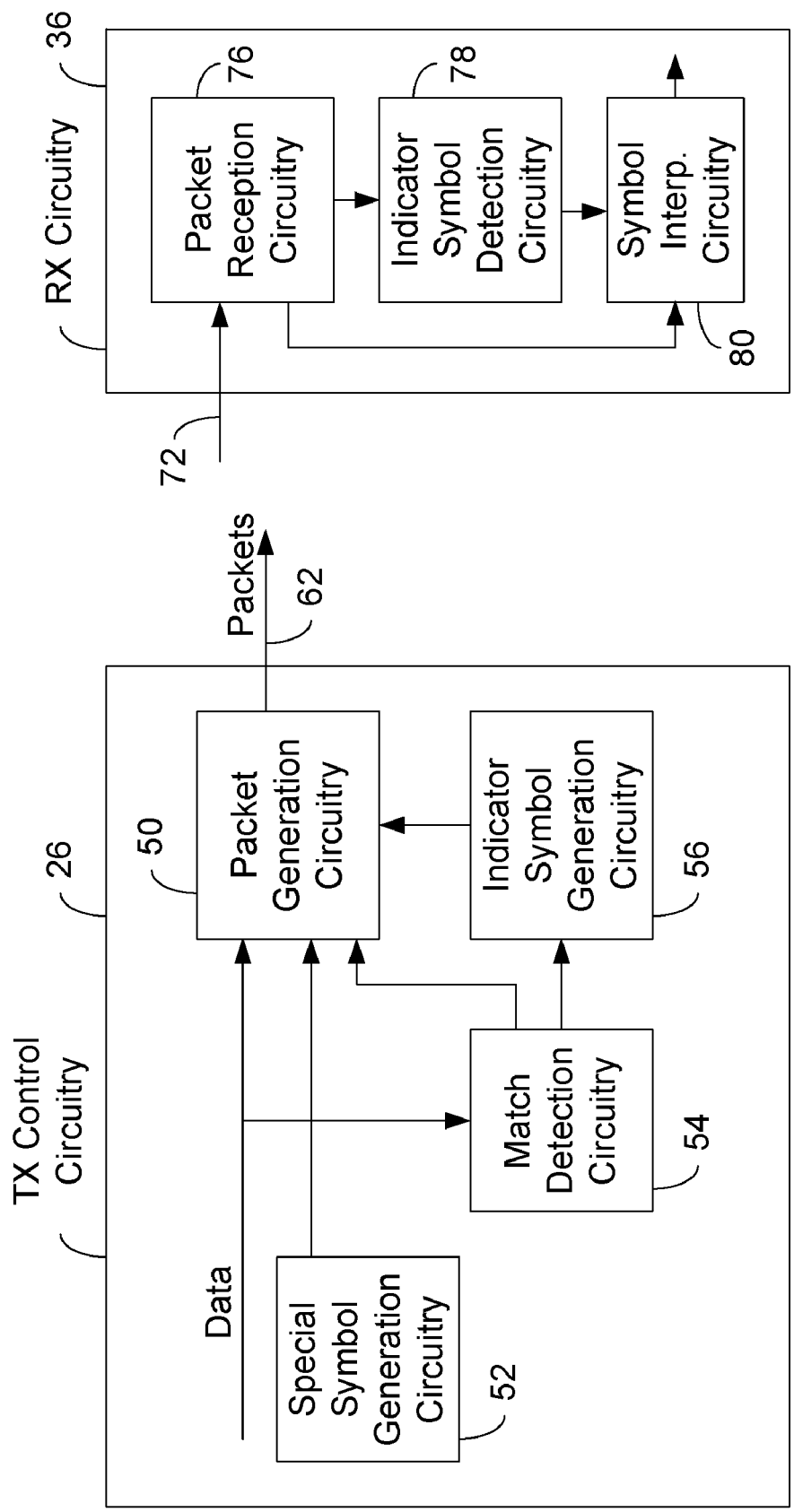

FIG. 4

| TLP | L0 | L1 | L2 | L3 | L4 | L5 | L6 | L7 | L8 | L9 | L10 | L11 | L12 | L13 | L14 | L15 |
|---|---|---|---|---|---|---|---|---|---|---|---|---|---|---|---|---|
| Time segment 0 | S | S | h | h | h | h | h | h | h | h | h | h | h | h | h | h |
| Time segment 1 | h | h | d | d | d | d | I(e) | I(e) | I | I | E | E | S | S | h | h |

FIG. 5

| Symbols Transmitted | L0 | L1 | L2 | L3 | L4 | L5 | L6 | L7 | L8 | L9 | L10 | L11 | L12 | L13 | L14 | L15 |
|---|---|---|---|---|---|---|---|---|---|---|---|---|---|---|---|---|
| Time segment 0 | S | S | h | h | h | h | h | h | h | h | h | h | h | h | h | h |
| Time segment 1 (Indicator Symbols) | S | S | S | S | S | S | C | C | S | S | S | S | S | S | S | S |
| Time segment 2 | h | h | d | d | d | d | I(e) | I(e) | I | I | E | E | S | S | h | h |

FIG. 6

TLP

| | L0 | L1 | L2 | L3 | L4 | L5 | L6 | L7 | L8 | L9 | L10 | L11 | L12 | L13 | L14 | L15 |
|---|---|---|---|---|---|---|---|---|---|---|---|---|---|---|---|---|
| Time segment 0 | S | S | h | h | h | h | h | h | h | h | h | h | h | h | h | h |
| Time segment 1 | h | h | d(ls) | d | d | d | d | d | d | d | d | d | d | d | d | d |
| Time segment 2 | d | d | d(ls) | d | d | d | — | — | — | E | E | S | S | S | h | h |

FIG. 7

Symbols Transmitted

| | L0 | L1 | L2 | L3 | L4 | L5 | L6 | L7 | L8 | L9 | L10 | L11 | L12 | L13 | L14 | L15 |
|---|---|---|---|---|---|---|---|---|---|---|---|---|---|---|---|---|
| Time segment 0 | S | S | h | h | h | h | h | h | h | h | h | h | h | h | h | h |
| Time segment 1 (Indicator Symbols) | S̲ | S̲ | C | S̲ | S̲ | S̲ | S̲ | S̲ | S̲ | S̲ | S̲ | S̲ | S̲ | S̲ | S̲ | S̲ |
| Time segment 2 | h | h | d(ls) | d | d | d | d | d | d | d | d | d | d | d | d | d |
| Time segment 3 (Indicator Symbols) | S̲ | S̲ | C | S̲ | S̲ | S̲ | S̲ | S̲ | S̲ | S̲ | S̲ | S̲ | S̲ | S̲ | S̲ | S̲ |
| Time segment 4 | d | d | d(ls) | d | d | d | — | — | — | E | E | S | S | S | h | h |

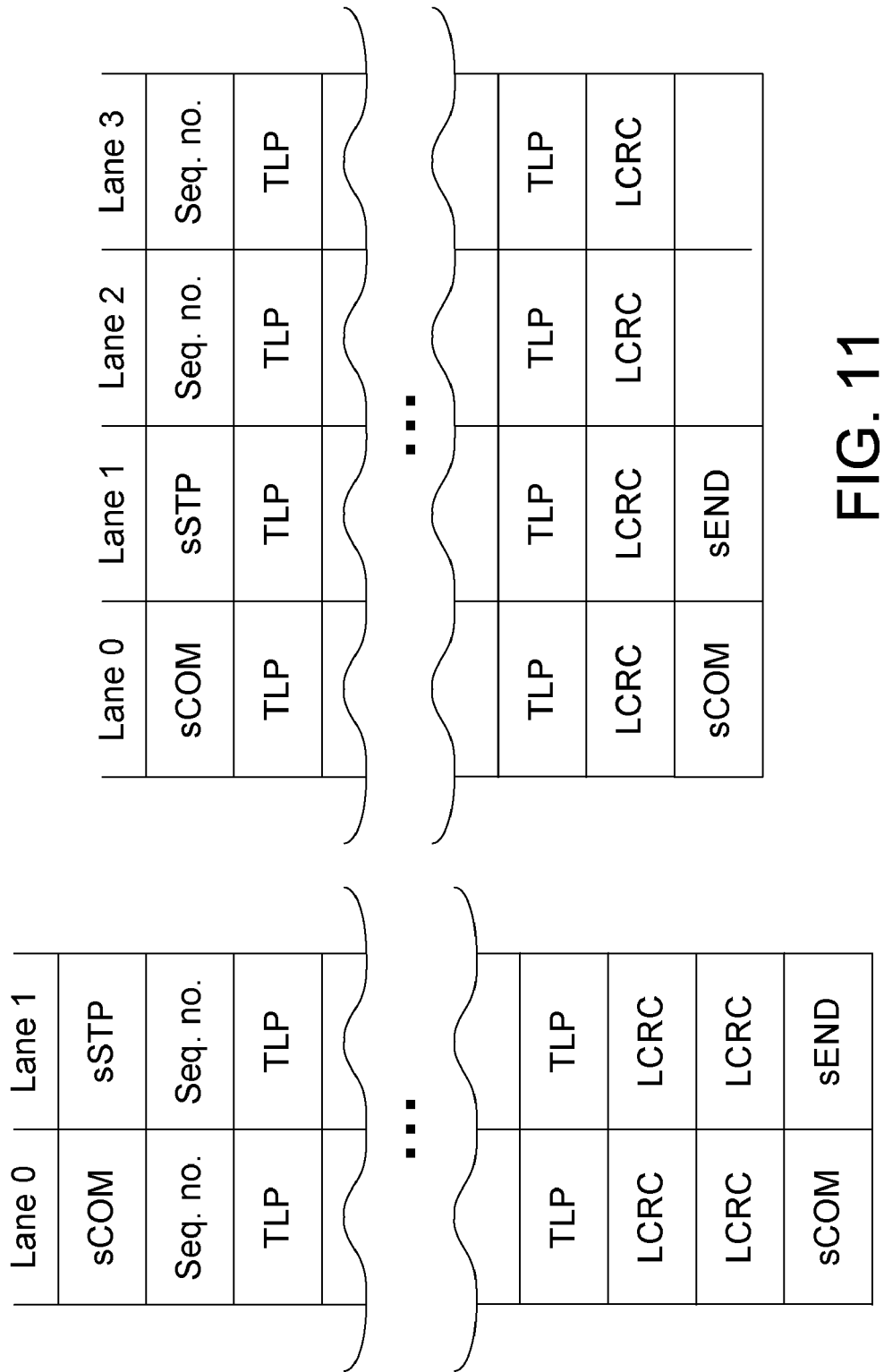

LINK INTERFACE TECHNIQUE INCLUDING DATA INDICATOR SYMBOLS

BACKGROUND

1. Technical Field

Embodiments of the invention relate to a link interface technique including data indicator symbols.

2. Background Art

Various encoding techniques have been used in transmitting data. One commonly used technique is an 8B/10B code in which 8-bit data symbols are mapped to 10-bit encoded symbols. In 8B/10B encoding, there are as many 1's as 0's in a string of two symbols and restrictions on the number of 1's and 0's in a row. This leads to DC balance, bounded disparity, and enough 1 to 0 and 0 to 1 transitions to allow clock recovery. Special symbols (control characters) may be used to indicate such things as end-of-frame, start-of-packet, link idle, skip. In 8B/10B encoding, there is no conflict between data and control characters. That is, data will never be represented by the same string of 10 bits as one of the control characters.

An advantage of the 8B/10B encoding is that there is no conflict between data and control characters. This is because the 8B/10B algorithm does not encode 8-bit data into some of the 1024 possible 10-bit combinations. The control characters are among the 10-bit combinations that are not used for representing 8-bit data. A disadvantage of the 8B/10B encoding is that it uses two extra bits to convey data. That can result in a substantial decrease in effective available bandwidth as compared to a technique in which 8 bits are represented with fewer than 10 bits.

PCI Express® (PCI-E or PCIe) is a input/output (I/O) interconnect that uses 8B/10B encoding. A PCI Express® Base Specification Revision 2.0, Dec. 20, 2006, is provided by the PCI-SIG®.

Special symbols, referred to as K-codes, used in PCIe 2.5 GT/s and 5 GT/s modes of operation as shown in the Table 1 as follows (from section 4.2.1.2 of the PCI Express® Base Specification Revision 2.0, Dec. 20, 2006).

TABLE 1

Special Symbols of PCI Express Revision 2.0

| Encoding | Symbol | Name | Description |
|---|---|---|---|
| K28.5 | COM | Comma | Used for Lane and Link initialization and management |
| K27.7 | STP | Start TLP | Marks the start of a Transaction Layer Packet |
| K28.2 | SDP | Start DLLP | Marks the Start of a Data Link Layer |
| K29.7 | END | End | Marks the end of a Transaction Layer Packet or a Data Link Layer Packet |
| K30.7 | EDB | EnD Bad | Marks the end of a nullified TLP |
| K23.7 | PAD | Pad | Used in Framing and Link Width and Lane ordering negotiations |
| K28.0 | SKP | Skip | Used for compensating for different bit rates for two communicating Ports |
| K28.1 | FTS | Fast Training Sequence | Used within an Ordered Set to exit from L0s to L0 |
| K28.3 | IDL | Idle | Used in the Electrical Idle Ordered Set (EIOS) |
| K28.4 | | | Reserved |
| K28.6 | | | Reserved |
| K28.7 | EIE | Electrical Idle Exit | Reserved in 2.5 GT/s Used in the Electrical Idle Exit Ordered Set (EIEOS) and sent prior to sending FTS at speeds |

TABLE 1-continued

Special Symbols of PCI Express Revision 2.0

| Encoding | Symbol | Name | Description |
|---|---|---|---|
| | | | other than 2.5 GT/s |

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

FIG. 2 is a block diagram representation of transmitter control circuitry of FIG. 1 according to some embodiments.

FIG. 3 is a block diagram representation of receiver circuitry of FIG. 1 according to some embodiments.

FIG. 4 is a graphical representation of transaction layer packet (TLP) symbols in lanes without indicator symbols.

FIG. 5 is a graphical representation of symbols in lanes that are transmitted with indicator symbols according to some embodiments.

FIG. 6 is a graphical representation of TLP symbols in lanes without indicator symbols.

FIG. 7 is a graphical representation of symbols in lanes that are transmitted with indicator symbols according to some embodiments.

FIG. 10 is a graphical representation of symbols in a framed TLP on a X2 link according to some embodiments.

FIG. 11 is a graphical representation of symbols in a framed TLP on a X4 link according to some embodiments.

DETAILED DESCRIPTION

Figure 1:
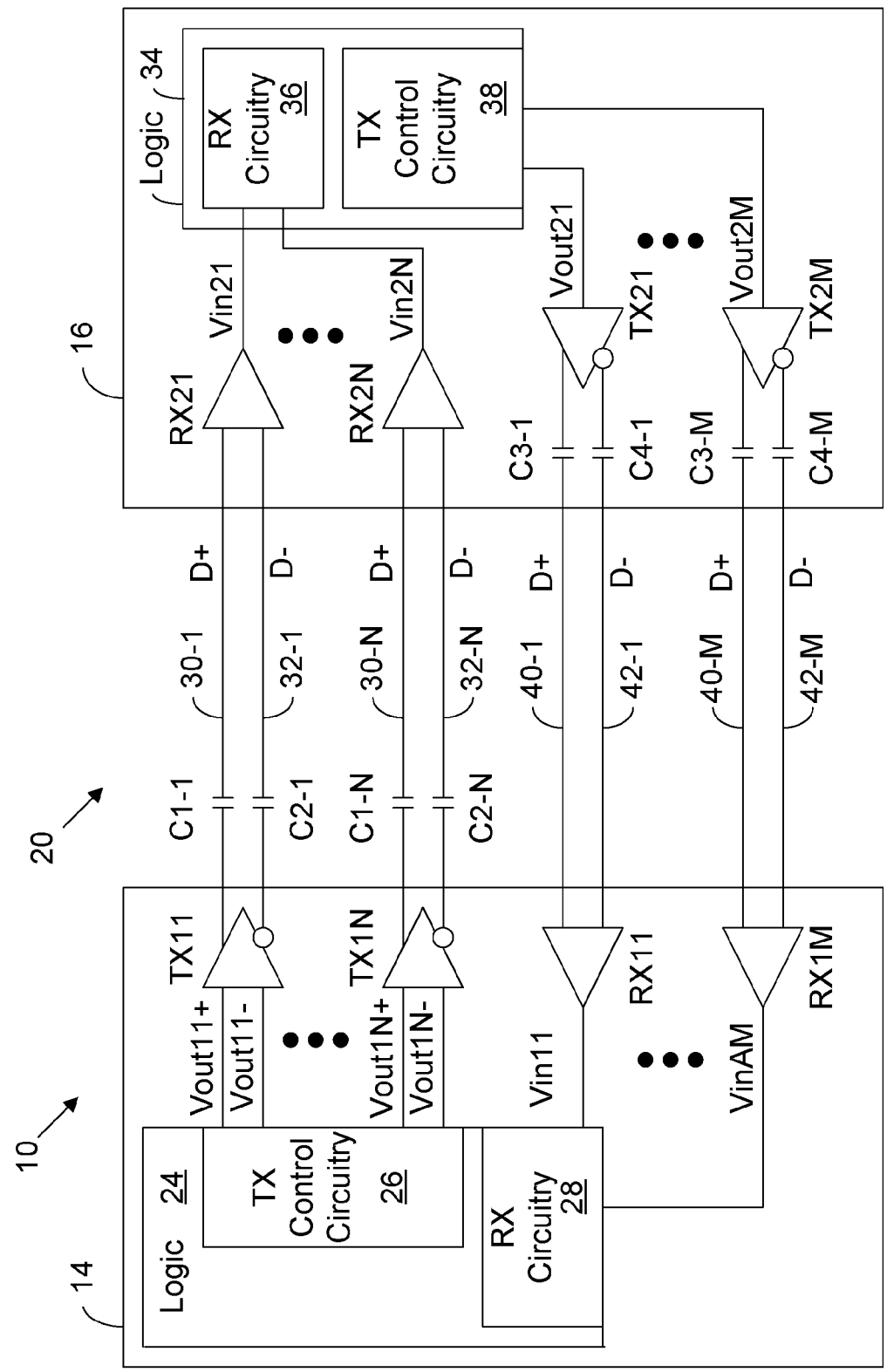
FIG. 1 is a block diagram representation of a system including first and second chips coupled through a link according to some embodiments.

Embodiments of the invention include a link interface technique that includes data indicator symbols that indicate when data has the same set of bits as a special symbol (special character). In some embodiments, 8 bits of data is represented with 8 bits, rather than 10 bits as in 8B/10B encoding. In some embodiments, at least some special character are two symbols in consecutive lanes or two symbols in consecutive time segments. In other embodiments, some or all special characters include only one symbol. There is a chance that transmitted data will be the same as a special character. To avoid confusion, when a match between data and special characters is detected, data indicator symbols transmitted to indicate to a receiver that such a situation has occurred. In some embodiments, the data symbols are unencoded data that match the intended data bit for bit. In other embodiments, the data symbols may be scrambled or encoded data (for example, to maintain DC balance).

The interface techniques described herein may be used in various interfaces. For example, the technique may be used in improving the bandwidth efficiency (the amount of useful data transferred at a given raw bit rate) of a PCI Express (PCIe) Link. Other embodiments do not involve a PCIe link.

PCIe presently uses an 8b/10b encoding technique, which uses 10 bits to represent 8 bits of meaningful data. By replacing this mechanism with a technique that, in the majority of cases, results in 1 bit of meaningful data being transferred for each 1 bit of data on a conductor, the effective bandwidth of the link may be increased. Not only does this increase performance, but may also result in a power reduction, because the power may be tied directly to the raw bit rate on the link.

The future generation of PCI Express may adopt some new encoding technique. Because PCIe has attributes of both serial and parallel links, existing solutions do not work well for PCIe. Any new encoding technique for PCIe should satisfy the following basic requirements:

1. DC Balance
2. Edge Density
3. Run Length
4. Resulting link b/w utilization efficiency
5. Functional replacement of K codes & related functionality The first four are assumed to be comprehended by using a suitable data scrambling technique combined with some fall back protocol that will ensure the first three, although at some cost to the fourth. The fifth item is the focus of this disclosure.

Basic functional capabilities provided in PCIe today using K codes are:

Initial link negotiation (Training Sets)
Period link clock adjustment (Comma/Skip sets)
Power management control (Electrical Idle enter/exit, Fast Training Sets for L0s exit)
Framing for Data Link Layer and Transaction Layer packets In addition to replacing these basic functional capabilities, the impacts to multi-modal implementation complexity (as components supporting the new link speed/mode will need to support the existing 2.5 GT/s and 5 GT/s modes) should also be considered. In some embodiments, the data patterns shown here are never scrambled or descrambled, in part because certain of these data patterns will be used to reset the scrambler. In this situation, sequences are added and processed at "lower level" than scrambling. Impacts to power, latency, circuit area, and such may also be considered. It is believed that in at least some embodiments, the techniques of the invention do not impact these considerations in any significant way. In some embodiments, the techniques described herein preserve the existing packet framing mechanisms' ability to allow the PCIe Physical Layer to comprehend packet boundaries without having to parse the packet contents.

Referring to FIG. 1, a system 10 includes a chip 14 and a chip 16 that communicate through a link 20. Chip 14 includes logic 24 that includes transmitter control logic 26 that controls the signals being transmitted by transmitters TX11 . . . TX1N. Data may be represented in packets. As shown in FIG. 1, differential signals Vout11+, Vout11− . . . Vout1N+, Vout1N− are provided to transmitters TX11 . . . TX1N. Alternatively, the signals from TX control circuitry 26 may be single ended. Although voltage signals are represented, current mode transmitters can be used. Transmitter control circuitry 26 may use an encoding technique including control characters as described herein. Link 20 includes differential lanes 30-1, 32-1 . . . 30-N, 32-N each carrying D+ and D− signals. Decoupling capacitors C1-1, C2-1 . . . C1-N, C2-N may be used in the links.

Chip 16 includes receivers RX21 . . . RX2N that provides a Vin21 . . . Vin2N signals in response to the differential signals and provide them to RX circuitry 36 of logic 34. Logic 34 recovers the data from packets. Logic 34 includes transmitter control logic 38 to provide Vout21 . . . Vout2M signals to transmitters TX21 . . . TX2M. Alternatively, the Vout21 . . . Vout2M signals could be differentials. Transmitters TX21 . . . TX2M provide differential signals (including data D+, D−) through lanes 40-1, 42-1 . . . 40-M, 42-M. Decoupling capacitors C3-1, C4-1 . . . C3-M, C4-M are included in chip 16 (but could be included outside the chip). In some embodiments, decoupling capacitors are not used. Chip 14 includes receivers RX11 . . . RX1M. Logic 24 includes receiver (RX) circuitry 28. The value of M may be the same as or different than the value of N.

The following tables shows how existing PCIe concepts can be used in some embodiments of the new encoding technique. Other embodiments of the invention may have somewhat different details. Table 2 illustrates a mapping of 8B/10B symbols to the new encoding. As shown in Table 2, current K-codes are typically replaced with one or two 8-bit symbols. Table 3 shows byte stream pairs with special meanings that may be used in some embodiments. Table 4 shows lane stream pairs with special meanings. Again, as noted, other embodiments do not include these details. For example, in other embodiments, the special characters may be other than one or two 8-bit symbols.

TABLE 2

Mapping of 8 b/10 b Symbols to New Encoding

| Current | Replaced By |
|---|---|
| COM K-Code | sCOM = 1010 1100 |
| STP (Start TLP) K-Code | sCOM followed by sSTP = 11110000 (in byte stream) |
| SDP (Staff DLLP) K-Code | sCOM followed by sSDP = 11110001 |
| END (End Good) K-Code | TLP: sCOM followed by sEND = 11111100 DLLP: No end |
| EDB (End Bad) K-Code | TLP: sCOM followed by sEDB = 11110011 |
| PAD K-Code | sPAD = 0000 0000 |
| SKP K-Code | sSKP = 1100 0001 |
| FTS (Fast Training Sequence) | sFTS = 0101 0101 |
| IDL (Idle) K-Code | sIDL 0000 0000 |
| EIE (Electrical Idle Exit) K-Code | sEIE = 0101 0101 (==FTS) |
| no current equivalent - | sESC = 1111 0000 {escape} |

TABLE 3

Byte Stream Pairs with Special Meanings

| Byte Stream Sequence | Indicates |
|---|---|
| sCOM + Sstp | Start of TLP |
| sCOM + sEND | End (good) of TLP |
| sCOM + sEDB | End Bad of TLP |
| sCOM + sSDP | Start of DLLP |

TABLE 4

Lane Stream Pairs with Special Meanings

| Lane Stream Sequence | Indicates |
|---|---|
| sCOM + sTS1 + <next 14 Bytes> | Training Set #1 sequence |
| sCOM + sTS2 + <next 14 Bytes> | Training Set #1 sequence |
| sCOM + sSKP + <next 14 Bytes> | Comma/Skip sequence |
| sCOM + sEIOS + <next 14 Bytes> | Electrical Idle Start sequence |
| sCOM + sEIE + <next 14 Bytes> | Electrical Idle Exit sequence |

In some embodiments, the "next 14 Bytes" of these sequences contain the information that is included in the current versions of these sets, and may also include data values (dynamically or statically) chosen to ensure the requirements associated with run length, edge density and DC balance are satisfied.

In some embodiments, special characters are two symbols long and in a multilane link, these two symbols are on two consecutive lanes with some additional restrictions. For example, in some embodiments, an STP can only start in lane 0, 4, 8, 12, in the case of a 12 or more lane link. It is possible that data (such as in two consecutive lanes with the restrictions) can look like these special characters. This situation is expected to be rare as the data may be scrambled and must have the exact same pattern as the special characters in two consecutive lanes with the appropriate restrictions. In order to prevent data from being interpreted as control information, data indicator symbols are transmitted and interpreted by logic (such as logic 34) in the receiver as indicating that certain signals are data rather special characters. Depending on the implementation, the data may come before or after the data indicator signals. For one perspective, in some embodiments, in order to prevent data from being interpreted as control information, the data is "escaped" by transmitting a symbol time segment's worth of sCOM on the lane(s) with the byte stream pairs with special meanings, on all lanes followed by the actual payload.

In some embodiments, such as for links wider than x4, this enables cases in which escaped and non-escaped control symbols are mixed in one symbol time segment. This may maintain a closer resemblance to current PCIe in this regard, since the existing K-codes can be freely mixed with data codes (and yet deciphered)).

There are various ways in which the described techniques can be implemented. FIG. 2 illustrates implementations of transmitter control circuitry 26 for some embodiments, but other embodiments may be somewhat different. Referring to FIG. 2, TX control circuitry 26 includes special signal generation circuitry 52 to generates special characters to be provided to packet generation circuitry 50 for use in packets. Data symbols are provided to packet generation circuitry 50 and to match detection circuitry 54. If data symbols match special characters, indicator symbols are generated by indicator symbol generation circuitry 56. The indicator symbols are provided to packet generation circuitry 50 for inclusion in the packets. In some embodiments, the indicator symbols are provided in response to all matches between data symbols and special characters. In other embodiments, the indicator symbols are provided only when there is a match between data and special characters under certain circumstances. For example, in some embodiments, given certain constraints, it might not make sense for a special character to be at a particular position so indicator symbols are not needed or used. The packets (collections of symbols) are provided to conductors 62 to be provided to the transmitters.

FIG. 3 illustrates implementations of RX circuitry 36 for some embodiments, but other embodiments may be somewhat different. Referring to FIG. 3, RX circuitry 36 includes packet reception circuitry 76 that receives packets from conductors 72 and provides signals to indictor symbol detection circuitry 78 and to symbol interpretation circuitry 80. If indicator symbol detection circuitry 78 detects indicator symbols it is indicated to symbol interpretation circuitry 80 so that it interprets the symbols properly. Examples of the interpretation are provided below.

FIG. 4 shows the TLP symbols without the data indicator symbols (escape symbols). FIG. 5 shows the symbols that are transmitted on the lanes and includes data indicator symbols. The examples of FIGS. 4 and 5 use the following notation.

(1) (S, S): STP (sCOM, sSTP)

(2) (E, E): END (sCOM, sEND)

(3) ($\underline{S}$, $\underline{S}$): (SCOM, SCOM) denotes next symbol position is data or a special character (kCharacter).

(4) (C, C): denotes the next symbol position is strictly data—which happens to be the same as a special character and therefore causes the data indicator symbols.

(5) All sESC/sCOM in the symbol time segment 1 in FIG. 5 are data indicator symbols (escape symbols). For example, in lanes 6 and 7 of symbol time segment 1 are designated as 1(e).

(6) h—header; d—payload data; 1—LCRC (link cyclic redundancy check) signals. The term payload data is used to distinguish data (d) from other types of data such as header and LCRC data.

FIG. 4 illustrates various symbols provided at time 0 and time 1. The S and S in lanes L0 and L1 at symbol time segment 1 represent sCOM+sSTP byte stream pair. The h in lanes L2-L15 in symbol time segment 1 and h in lanes L0 and L1 in symbol time segment 1 contain the header for a write request. Lanes L2-L5 of symbol time segment 2 include four bytes of data (d) for that Request, and the LCRC for that Write ("1 1") in lanes L6-L9 and both the end of that Write Request ("E E") and the start of another TLP ("S S h h") in lanes L10-L12 of symbol time segment 1. However, the LCRC for lanes L6 and L7 in symbol time segment 1 are the same as sCOM and sEND respectively after scrambling. Because they are the same as a special character, the LCRC of lanes L6 and L7 are referred to as 1(e) (where e represents symbols like END TLP (sCOM, sEND)). Therefore, it could be interpreted that the transaction ends in lanes L6 and L7. In some embodiments, the sequence number is not sent here to preserve the original PCIe TLP layout. Instead, sequence number is implicit and is used to compute the LCRC. Thus, the same benefit may be achieved as dealing with dropped TLPs without having to send the sequence number explicitly.

FIG. 5 illustrates symbols transmitted in lanes L0-L15. The symbols of symbol time segment 0 and symbol time segment 2 are the same as that of symbol time segments 0 and 1 in FIG. 4. The symbols of time 1 in lanes L0-L5 and L8-L15 are data indicator symbols S to that are ignored by the receiver. The symbols of symbol time segment 1 in lanes L6 and L7 are data indicator symbols C C which indicate that the symbols in lanes L6 and L7 in the next symbol time segment (in this case symbol time segment 2) are data. Note that data "d" in two consecutive lanes also may be the same as a special character. The choice of LCRC was just an example. In some embodiments, the end of the first packet and the start of the second packet are not escaped because the transmitter intends these Byte Pairs to be interpreted according to their special meaning. In some embodiments, transmission of sCOMs can be distinguished by the receiver from the start of a sequence by the simultaneous presence of sESCs in the same symbol time segment.

FIG. 6 is similar to FIG. 4 except that two data symbols in the same lane (lane L2) match a special character including two symbols in the same lane as in table 4 (lane stream pairs). In FIG. 6, "ls" refers to a lane stream and the two d(ls) symbols refer to two data symbols in consecutive time segments that are the same as a special character in consecutive time segments. More particularly, d(ls) and d(ls) in time segments 1 and 2 of lane L2 are the same as a special character.

FIG. 7 shows how the situation of FIG. 6 is dealt with in some embodiments. The symbols of time segment 1 of FIG. 6 are provided in time segment 2 of FIG. 7. In time segment 1, data indicator symbols S are provided in lanes L0, L1, and L3-L15 and are interpreted by RX circuitry 36 as being data indicator symbols. RX circuitry 36 interprets data indicator symbols as meaning that symbols in the current time segment are to be ignored, but symbols in the next time segment are to be processed as data. The data indicator symbols after the Symbol C indicates that the symbol in lane L2 in the next time segment is data. Alternatively, in some embodiments, in the situation of FIG. 6, each of the data indicator symbols of time segment 1 in FIG. 7 could be the same (for example, an S symbol). In FIG. 7, in time segment 3, the symbols are the same as in time segment 1, and the symbols in time segment 4 are the same as in time segment 2 of FIG. 6. In some embodiments, more complicated situations may occur such as when special characters occur in the same time segment as the d(ls). Particular indicator symbols can indicate to the receiver that the symbol in the same lane in the next time segment is all or part of a special character. In this case, some of the indicator symbols may be special character indicator symbols while other of the indicator symbols are data indicator symbols.

Note that in some embodiments, other data symbols such as two "h" symbols or an "h" symbol and a "d" symbol in the same lane could be the same as a special character and be treated the same as the two d(ls) symbols in FIGS. 6 and 7.

It would typically be very rare for data symbols to be identical to a special character. Accordingly, the bandwidth and power consumption benefits of using 8 bits rather than 10 bits to represent data far outweighs the bandwidth and power used for the very occasional use of one or more extra time segments for data indictor symbols.

Other Information and Embodiments

Different embodiments may provide additional rules or variations to the above described embodiments. The following are some examples that are used in some embodiments, but not other embodiments. Because only certain lanes can legally contain Byte Stream pairs for packet framing, data values that equal the sCOM value only need to be escaped when they occur in such lanes. In general, all even numbered lanes (including Lane 0) are such lanes. The number of cases where escapes are required can be reduced by applying a more complicated rule. If we also consider the byte that follows the data that appears to be the sCOM, and only apply the escape when that byte is also equal to one of the codes that could follow an sCOM (sSTP, sSDP, sEND or sEDB), we may be able to considerably reduce the number of cases where escape is required (at a cost of increased complexity and somewhat reduced robustness). If we further consider that sSTP/sSDP can only occur in the lanes N=4*(0 . . . 7), and that sEND/sEDB can only occur in the lanes N=2+4*(0 . . . 7), we finally reach the following rule:

An escape is required when the data on a lane N=[0, 4, 8, 12, 16, 20, 24, 28] equals the sCOM symbol, and the data on lane N+1 is [sSTP, sSDP], or when the data on a lane N=[2, 6, 10, 14, 18, 22, 26, 30] equals the sCOM symbol, and the data on lane N+1 is [sEND, sEDB]

This technique, in addition to the complexity associated with the escape mechanism, also introduces a different byte shift between the internal data path and the external lanes that introduces additional complexity into the byte to lane mapping function.

Note that the concept of escaping a Byte Stream using a Lane Stream escape mechanism can be applied to any length of Byte Stream symbols. In the example above, the Byte Streams with special meaning are all two bytes in length, but the escaping concept would apply equally to single byte or N byte cases. In addition, although we have assumed 8 bit bytes, this is not fundamentally required.

For single lane implementations, we could either use the same symbol-pair concept across two symbols or use a slight variation in using the sCOM as the escape character. But in the latter case, the aliasing probability becomes a multiple (as many K-characters) of $2^{-8}$ as opposed to a multiple of $2^{-16}$.

As noted, some embodiments do not include one or more of these details.

Figure 8:
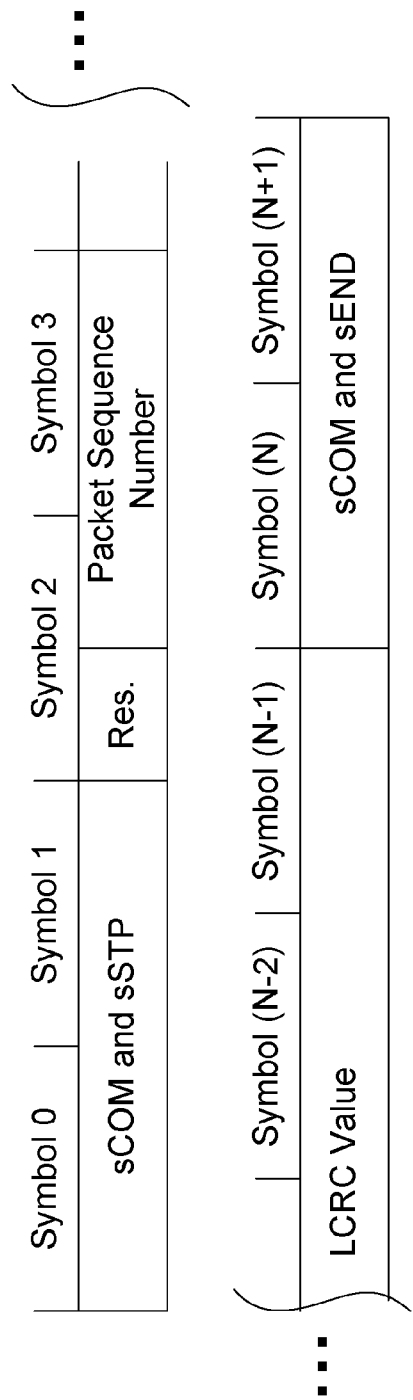
FIG. 8 is a graphical representation of symbols with a TLP according to some embodiments.

FIG. 8 shows a "Byte Stream" view of a TLP with framing symbols applied (conceptually, the sequence of symbols in a packet, which for an x1 Link is the same as the lane stream view). In the case in which the special characters take only one symbol, there could be N−1 symbols, rather than N+1 symbols.

Figure 9:
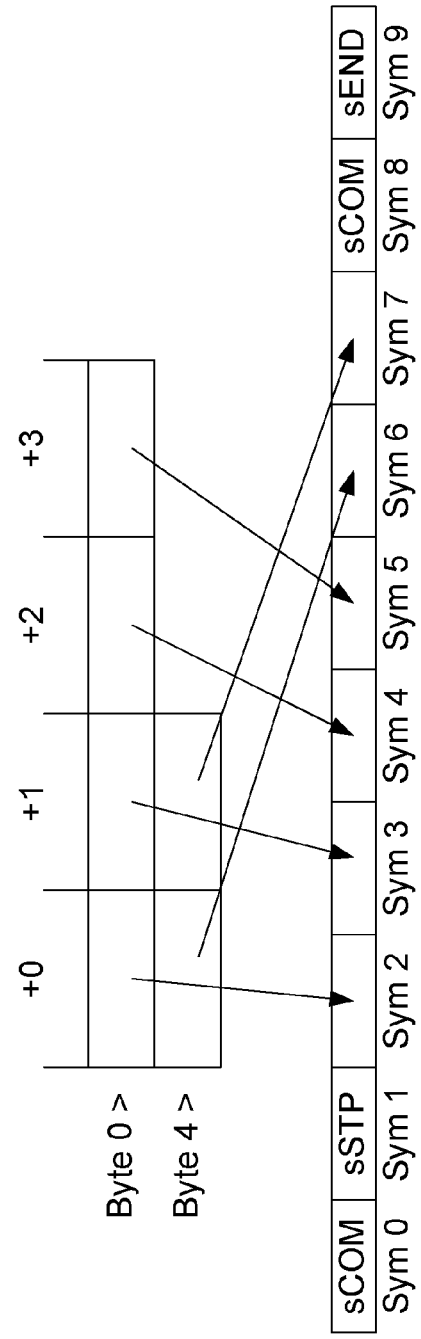
FIG. 9 is a graphical representation of symbols with a data link layer packet (DLLP) according to some embodiments.

FIG. 9 shows the mapping of a Byte Stream view onto a Lane Stream view for a x8 link for DLLP with frame symbols applied.

FIGS. 10 and 11 show the "Lane Stream" view for framed TLP on x2 and x4 links.

The conductors mentioned herein do not have to be of continuous material. For example, they may include vias or other connection structures.

The operation of the logic 24 and 34 (including the TX control circuitry and RX circuitry) may be performed completely in hardware or may be assisted in software or firmware, such as through a processor (microprocessor or digital signal processor (DSP)).

In the above example of Table 2, the symbols are 8 bits, but they could be another length such as 9 bits for some encoding. As other examples, data may be represented by 16 or 17 bits or some other number of bits.

There may be intermediate structure and conductors between the illustrated components. In actual implementations of the systems of the figures, there would be additional circuitry, control lines, and perhaps interconnects which are not illustrated. When the figures show two blocks connected through conductors, there may be intermediate circuitry that is not illustrated. The shape and relative sizes of the blocks is not intended to relate to actual shapes and relative sizes.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B."

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The inventions are not restricted to the particular details described herein. Indeed, many other variations of the foregoing description and drawings may be made within the scope of the present inventions. Accordingly, it is the following claims including any amendments thereto that define the scope of the inventions.

What is claimed is:

1. A chip comprising:
  a plurality of transmitters, each configured to transmit data serially on a respective lane in a multilane serial link employing time segments;
  generation circuitry to provide symbols including data symbols and special characters to the transmitters to be transmitted, the symbols including data symbols and special characters having the same encoding;
  match detection circuitry to detect when a data symbol has an encoding matching a special character; and
  indicator symbol generation circuitry to create data indicator symbols in response to detected matches and to provide the data indicator symbols to the generation circuitry to be provided to the transmitters to be transmitted.

2. The chip of claim 1, wherein at least some of the special characters include two symbols.

3. The chip of claim 1, wherein symbols are transmitted in time segments and in different lanes and wherein the data indicator symbols are presented for multiple lanes of a symbol time segment.

4. The chip of claim 3, wherein a first type of data indicator symbol are not intended to be used by a receiver as data symbols or special character symbols, and a second type of data indicator symbol indicates the lanes with the second type of data in the next symbol time segment are data symbols.

5. The chip of claim 1, wherein data symbols are encoded data signals.

6. The chip of claim 1, wherein data symbols are unencoded data signals.

7. The chip of claim 1, wherein the generation circuitry also provides special character indicator symbols to the transmitters.

8. The chip of claim 1, wherein the generation circuitry includes packet generation circuitry and the data symbols, special symbols, and data indicator symbols are provided in packets.

9. The chip of claim 1, wherein at least some special characters are in consecutive time segments of a single lane and others of the special characters include two symbols that are transmitted in consecutive lanes in the same time segment.

10. The chip of claim 1, wherein data symbols are encoded data signals.

11. The chip of claim 1, wherein data symbols are unencoded data signals.

12. The chip of claim 1, wherein the symbols comprise 8-bit symbols.

13. The chip of claim 1, wherein an encoding scheme is implemented using 8-bit symbols to provide functional replacement of selected K codes of an 8B/10B encoding scheme.

14. The chip of claim 1, wherein the data symbols including multiple encodings representing the same data values, and the data symbols are selected by the generation circuitry to provide DC balance.

15. The chip of claim 1, wherein the chip is configured to support a PCI Express link.

16. The chip of claim 15, wherein an encoding scheme is implemented using 8-bit symbols to provide functional replacement of selected K codes of an 8B/10B encoding scheme.

17. The chip of claim 1, wherein the chip is configured to support a PCI Express link.

18. A system comprising:
  a serial link including lanes;
  a first chip including:
  transmitters;
  generation circuitry to provide data symbols and special characters to the transmitters to be transmitted, including data symbols and special characters having the same encoding;
  match detection circuitry to detect when a data symbol has an encoding matching a special character; and
  indicator symbol generation circuitry to create data indicator symbols in response to detected matches and to provide the data indicator symbols to the generation circuitry to be provided to the transmitters to be transmitted; and
  a second chip including:
  reception circuitry to receive data symbols and special characters;
  indicator symbol detection circuitry to detect data indicator symbols;
  symbol interpretation circuitry to respond to the detected indicator symbols by interpreting symbols associated symbols as data symbols rather than as a special character.

19. The system of claim 18, wherein at least some of the special characters include two symbols.

20. The system of claim 18, wherein in symbol time segments of lanes and wherein the data indicator symbols are presented for all lanes of a symbol time segment.

21. The system of claim 20, wherein a first type of data indicator symbol are not intended to be used by a receiver as data symbols or special character symbols, and a second type of data indicator symbol indicates the lanes with the second type of data in the next symbol time segment are data symbols.

22. The system of claim 18, wherein data symbols are unencoded data signals.

23. The system of claim 18, wherein the serial link comprises a PCI Express link.

24. The system of claim 18, wherein an encoding scheme is implemented using 8-bit symbols to provide functional replacement of selected K codes of an 8B/10B encoding scheme.

* * * * *